US012347410B2

(12) United States Patent
Sakauchi

(10) Patent No.: US 12,347,410 B2
(45) Date of Patent: Jul. 1, 2025

(54) ELECTRONIC MUSICAL INSTRUMENT AND MUSICAL PIECE PHRASE GENERATION PROGRAM

(71) Applicant: AlphaTheta Corporation, Yokohama (JP)

(72) Inventor: Hideyuki Sakauchi, Yokohama (JP)

(73) Assignee: ALPHATHETA CORPORATION, Yokohama (JP)

( * ) Notice: Subject to any disclaimer, the term of this patent is extended or adjusted under 35 U.S.C. 154(b) by 708 days.

(21) Appl. No.: 17/594,539

(22) PCT Filed: Apr. 23, 2019

(86) PCT No.: PCT/JP2019/017307
§ 371 (c)(1),
(2) Date: Oct. 21, 2021

(87) PCT Pub. No.: WO2020/217324
PCT Pub. Date: Oct. 29, 2020

(65) Prior Publication Data
US 2022/0230609 A1 Jul. 21, 2022

(51) Int. Cl.
*G10H 1/28* (2006.01)
*G10H 1/00* (2006.01)

(52) U.S. Cl.
CPC ............ *G10H 1/28* (2013.01); *G10H 1/0025* (2013.01); *G10H 2210/111* (2013.01); *G10H 2210/385* (2013.01)

(58) Field of Classification Search
CPC .. G10H 1/28; G10H 1/0025; G10H 2210/111; G10H 2210/385
See application file for complete search history.

(56) References Cited

U.S. PATENT DOCUMENTS 5,127,305 A * 7/1992 Saito ........................ G10H 1/42
84/DIG. 12
6,207,885 B1 3/2001 Nogami et al.

FOREIGN PATENT DOCUMENTS

| | | |
|---|---|---|
| JP | 3-280000 | 12/1991 |
| JP | 4-133095 | 5/1992 |
| JP | 6-259077 | 9/1994 |
| JP | 8-076760 | 3/1996 |
| JP | 2005-173632 A | 6/2005 |

(Continued)

OTHER PUBLICATIONS

International Search Report dated Jul. 16, 2019, Application No. PCT/JP2019/017307, English translation included; 4 pages.

(Continued)

*Primary Examiner* — Jianchun Qin
(74) *Attorney, Agent, or Firm* — Rankin, Hill & Clark LLP

(57) ABSTRACT

An electronic musical instrument includes a progression speed changing unit that changes a progression of transport using a predetermined formula such that a total time required for the transport to pass through a specific step section of musical piece data is not changed; a parameter setting unit that sets a parameter for the predetermined formula; and a musical phrase generator that generates a musical phrase by assigning the parameter set by the parameter setting unit to the predetermined formula based on the progression of the transport changed by the progression speed changing unit.

4 Claims, 9 Drawing Sheets

(56) References Cited

FOREIGN PATENT DOCUMENTS

| | | |
|---|---|---|
| JP | 2012-083413 | 4/2012 |
| JP | 2012-093632 | 5/2012 |
| JP | 5402167 | 1/2014 |
| WO | 2007/004540 | 1/2007 |

OTHER PUBLICATIONS

Extended European Search Report dated Oct. 19, 2022, Application No. 19926484.7; 7 pages.

International Preliminary Report on Patentability dated Sep. 28, 2021, 7 pages.

* cited by examiner

ELECTRONIC MUSICAL INSTRUMENT AND MUSICAL PIECE PHRASE GENERATION PROGRAM

TECHNICAL FIELD

The present invention relates to an electronic musical instrument and a musical phrase generation program.

BACKGROUND ART

There are conventionally known techniques of an electronic musical instrument or the like such as a music sequencer, in which a new rhythm pattern is generated to change a phrase in a specific step section and a new phrase is generated using a part of arpeggio pattern data recorded.

For example, Patent Literature 1 discloses a device for generating a rhythm pattern that continuously changes from sparse to dense by using an existing rhythm pattern. Patent Literature 1 executes a logical operation based on one rhythm pattern taken from a preset pattern storage and a quasi-random pattern output from a quasi-random pattern generation unit to output an n-bit-wide variation pattern, and generates a new phrase using the variation pattern.

Patent Literature 2 discloses a technique of generating a new phrase based on event data read out. Specifically, event data in arpeggio pattern data included in a range from a cutting start position to a cutting end position is sequentially and continuously read out from the first event data so that the first data is again read out after the last data is read out, and arpeggio data is generated based on the event data read out.

CITATION LIST

Patent Literature(s)

Patent Literature 1: JP 2012-83413 A

Patent Literature 2: JP 5402167 B

SUMMARY OF THE INVENTION

Problem(s) to be Solved By the Invention

However, since the technique described in Patent Literature 1 generates a rhythm pattern by the logical operation based on a preset pattern and a quasi-random pattern, a good rhythm pattern that may be found out by an operator during phrase generation is not easily reproducible.

Further, since the technique described in Patent Literature 2 generates a new phrase by cutting a predetermined section of arpeggio pattern data, a new phrase that can be generated by this technique is limited.

An object of the invention is to provide an electronic musical instrument and a musical phrase generation program capable of flexibly generating a musical phrase by controlling transport progression without changing phrase data itself, and capable of easily reproducing a musical phrase.

Means For Solving the Problem(s)

An electronic musical instrument of the invention includes: a progression speed changing unit configured to change a progression of transport using a predetermined formula such that a total time required for the transport to pass through a specific step section of musical piece data is not changed; a parameter setting unit configured to set a parameter for the predetermined formula; and a musical phrase generator configured to generate a musical phrase by assigning the parameter set by the parameter setting unit to the predetermined formula based on the progression of the transport changed by the progression speed changing unit.

A computer-readable musical phrase generation program of the invention causes a computer to function as the electronic musical instrument described above.

BRIEF DESCRIPTION OF DRAWING(S)

DESCRIPTION OF EMBODIMENT(S)

[1] Basic Concept of the Invention

Figure 1:
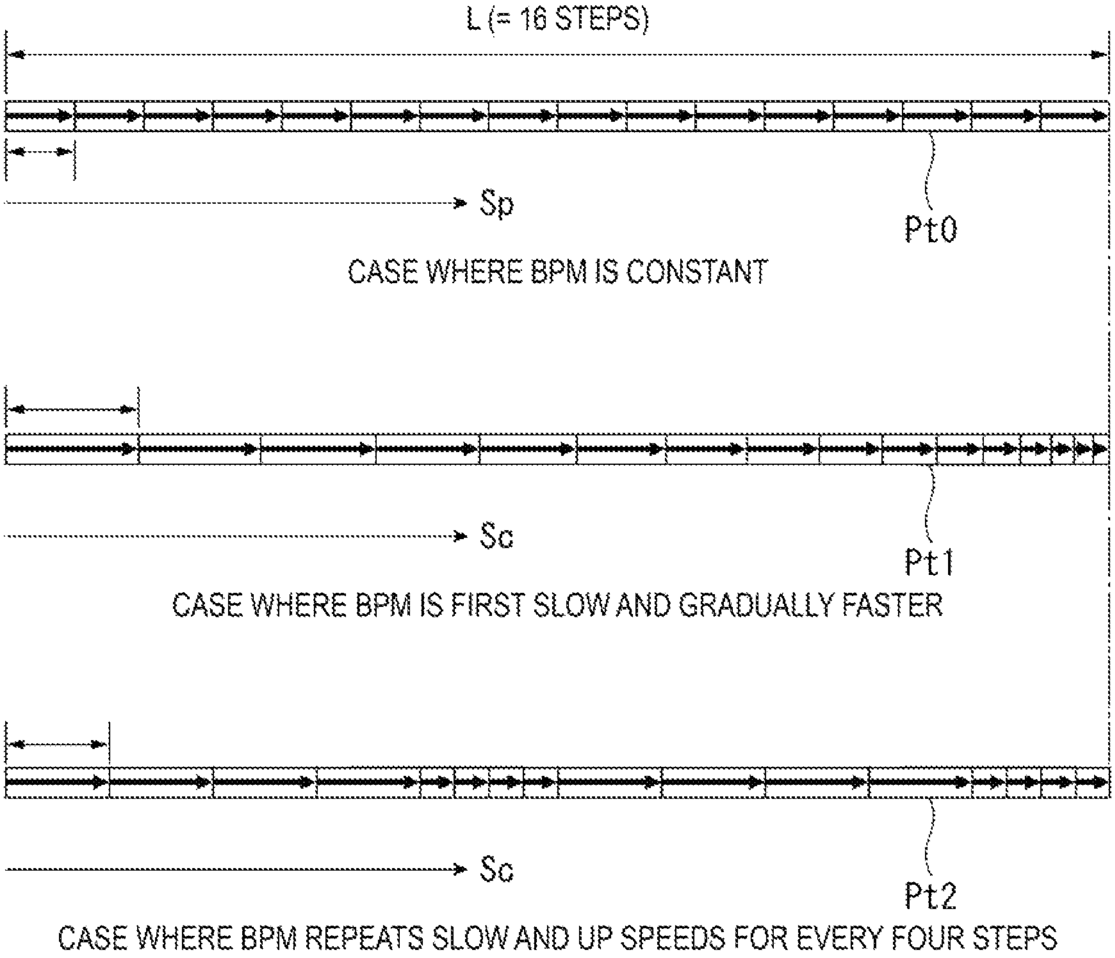
FIG. 1 is a schematic illustration for explaining a concept of the invention.

In a phrase generated by a typical music sensor, transport has a constant progression speed, and each step has an equal transport progression, like a pattern Pt0 in FIG. 1.

Herein, a unit length such as a semiquaver is referred to as a step. Transport sequentially passes through step 1, step 2, step 3 . . . as it progresses.

In the invention, a progression speed (beats per minute, BPM) of transport is dynamically changed in accordance with a predetermined formula Bc(s) without changing a total time required for transport to pass through a specific step section, as shown by a pattern Pt1 and a pattern Pt2 in FIG. 1.

Changing the progression speed (BPM) in a specific step section can generate a new phrase, that is, a musical phrase different from an original musical phrase.

Since a total time for a specific step section is not changed, combination with the next specific step section can be made smoothly to generate a musical phrase that flows naturally.

For instance, in a case of the pattern Pt1 in FIG. 1, a variable formula Bc(s) for a progression speed (BPM) that is first slow and gradually faster, is defined. This results in a musical phrase, different from the pattern Pt0, whose progression speed (BPM) gradually increases in a specific step section.

Further, in a case of the pattern Pt2 in FIG. 1, a variable formula Bc(s) for a progression speed (BPM) that repeats slow and up speeds for every four steps, is defined. This results in a musical phrase, different from the pattern Pt0, whose progression speed (BPM) is not constant in a bar.

A variable formula Bc(s) for a progression speed (BPM) is obtained as follows.

In a specific step section, when a transport progression before BPM change is defined as Sp (step), a transport progression speed (BPM) before BPM change is defined as Bp, a transport progression after BPM change is defined as Sc (step), and a transport progression speed (BPM) after BPM change is a variable formula Bc(s) that depends on a step, the transport progression speed Bc(s) is Bc(s)/Bp times larger than the transport progression speed Bp in a microscopic step section. A formula (1) below is thus held. Respective steps for the transport progression quantities not only include an integer but include a numerical value including a decimal point.

[Formula 1]

$$Sc = \int_0^{Sp} \frac{Bc(s)}{Bp} ds \quad (1)$$

Here, a formula (2) below is held using a specific step section L, on condition that a total time is not changed.

[Formula 2]

$$L = \int_0^{L} \frac{Bc(s)}{Bp} ds \quad (2)$$

Specifically, a case in which a predetermined BPM variable formula used for a progression speed changing unit 3 (see FIG. 4) generates a sawtooth wave, is considered. The BPM variable formula Bc(s) generating the sawtooth wave is represented by a formula (3) below.

[Formula 3]

$$Bc(s) = Bp + BpD\left(1 - \frac{2s}{L}\right) \quad (3)$$

Here, assuming that D is a parameter for setting a degree of change (e.g., slower or faster) relative to a transport progression speed Bp before BPM change and D is a value in a range from −1 to +1.

A formula (4) is derived by assigning the formula (3) into the formula (1).

[Formula 4]

$$Sc = \int \frac{Bp + BpD\left(1 - \frac{2s}{L}\right)}{Bp} ds = \int 1 + D\left(1 - \frac{2s}{L}\right) ds \quad (2)$$

A formula (5) is obtained by solving the formula (4) in a section from step 0 to step Sp.

[Formula 5]

$$\begin{aligned} Sc &= \left[s + Ds - \frac{Ds^2}{L}\right]_0^{Sp} \\ &= Sp + DSp - \frac{DSp^2}{L} \\ &= Sp\left\{1 + D\left(1 - \frac{Sp}{L}\right)\right\} \end{aligned} \quad (2)$$

A transport progression Sc after BPM change that is changed from a transport progression Sp before BPM change by the progression speed changing unit 3 can be calculated in accordance with the formula (5).

Figure 2:
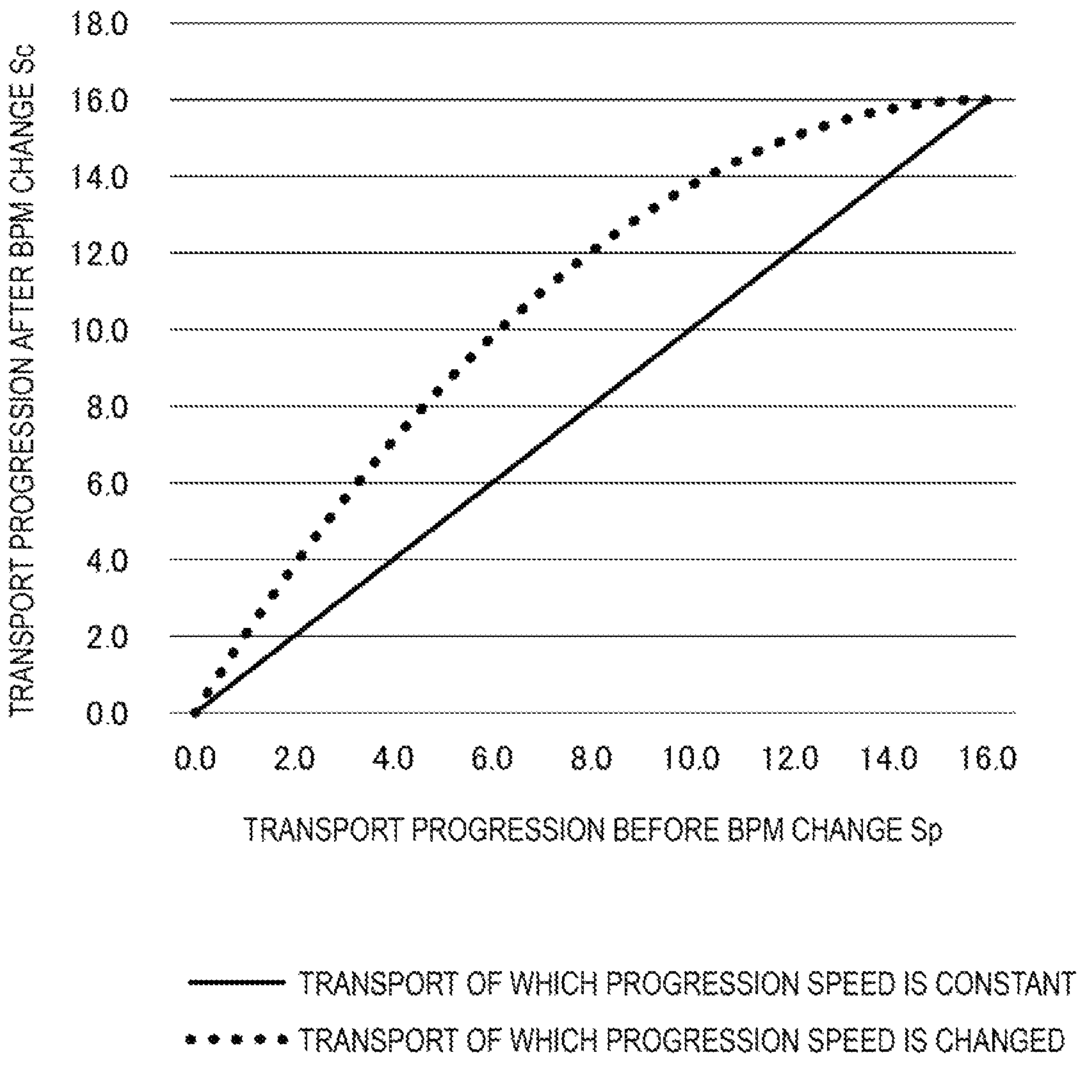
FIG. 2 is a first exemplary illustration for explaining a concept of the invention that shows a relationship between transport before BPM change and transport after BPM change.

A transport progression Sc after BPM change calculated in accordance with the formula (5) depends on parameters D, L. For instance, when the parameters are set to satisfy D=+1 and L=16 (16 steps), a transport progression Sc is represented by a broken line in FIG. 2. That is, the transport progression Sc is twice as much as the transport progression Sp at the beginning, is smaller gradually, and coincides with the transport progression Sp at the position of step 16.

Figure 3:
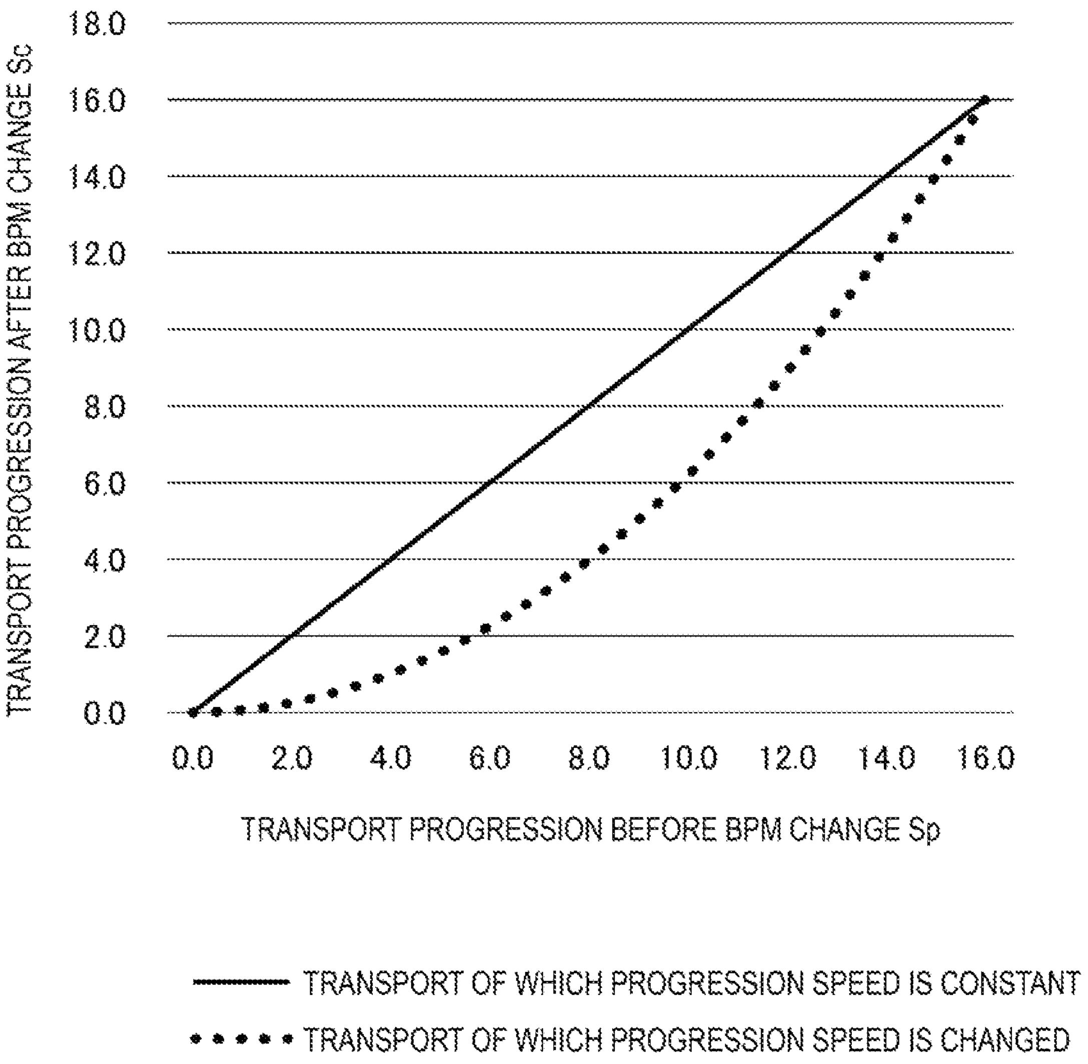
FIG. 3 is a second exemplary illustration for explaining a concept of the invention that shows a relationship between transport before BPM change and transport after BPM change.

When a degree of BPM change is set to satisfy D=−1, as shown in FIG. 3, the transport progression Sc after BPM change satisfies BPM=0 at the beginning, is larger gradually, and coincides with the transport progression Sp before BPM change at the position of step 16.

According to the invention, a new phrase is generated by changing a progression speed of transport in a specific step section in accordance with a predetermined formula, as described above. Since L is fixed to include, for example, 16 steps, a similar phrase is repeated in the next specific step section so that synchronization between the specific step sections is achieved. A newly generated phrase is thus not broken as a musical piece progresses.

[2] Embodiment of the Invention

Figure 4:
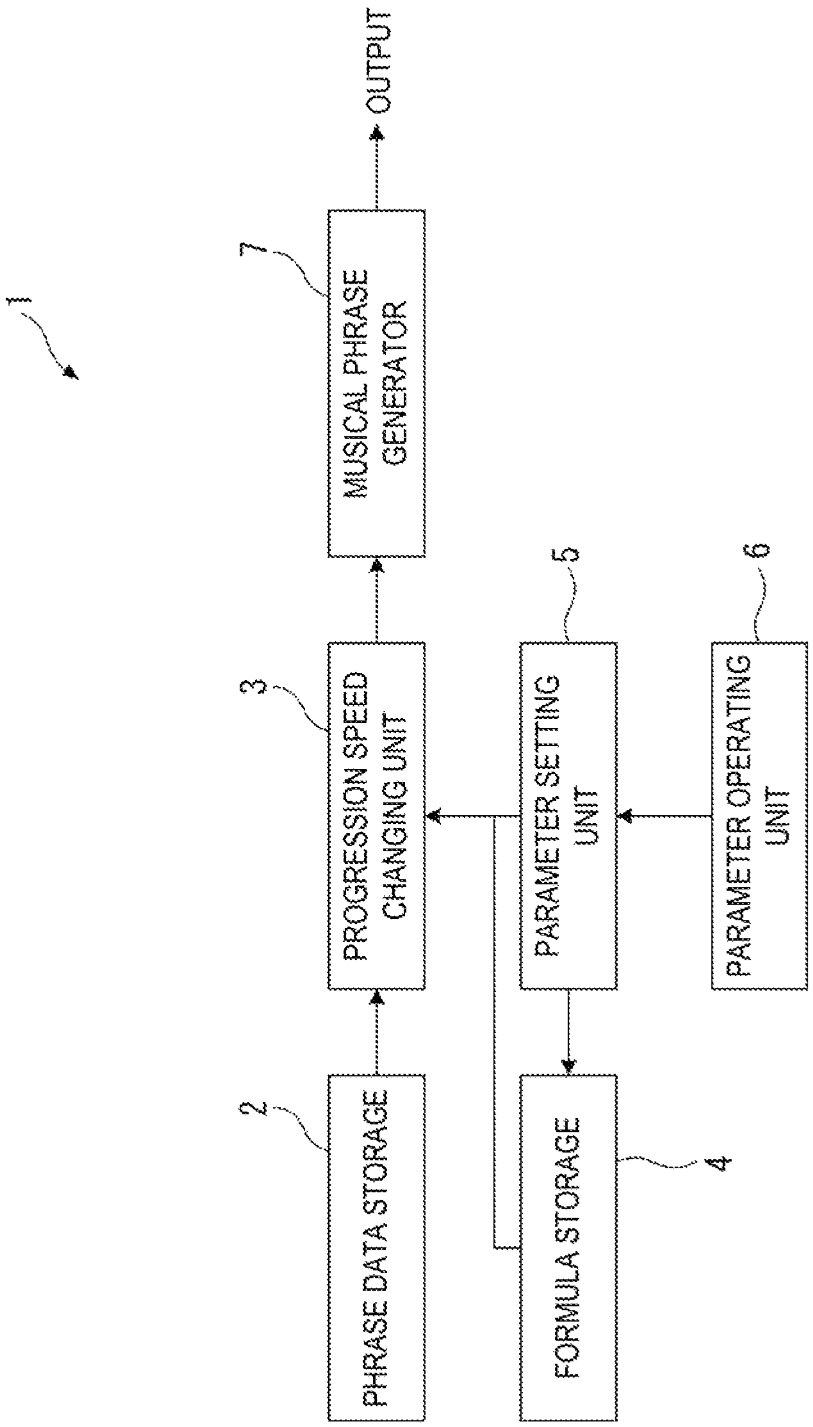
FIG. 4 is a block diagram showing a structure of an electronic musical instrument according to an exemplary embodiment of the invention.

An exemplary embodiment of the invention will be described below with reference to the attached drawings. FIG. 4 shows a music sequencer 1 according to the exemplary embodiment of the invention. The music sequencer 1 is an electronic musical instrument that can repeatedly reproduce predetermined phrase data created by an operator (performer). The music sequencer 1 includes a phrase data storage 2, a progression speed changing unit 3, a formula storage 4, a parameter setting unit 5, a parameter operating unit 6, and a musical phrase generator 7. Those components are configured as a computer-readable musical phrase generation program run on a computer.

The phrase data storage 2, which is configured by a storage such as a non-volatile memory, stores musical phrase data created by an operator of the music sequencer 1.

The phrase data to be stored is configured by a specific step section for reproduction including, for example, 16 steps and sounding data arranged at a predetermined step position. For instance, the operator creates musical phrase data by arranging sounding data at positions of steps 1, 4, and 7 among 16 steps.

The progression speed changing unit 3 selects a formula stored in the formula storage 4 configured by a storage such as a non-volatile memory to calculate a transport progression Sc after BPM change in a specific step section.

Formulae for BPM change will be described below.

(1) Rectangular (Square) Wave

When a formula for changing BPM generates a rectangular (square) wave, the BPM variable formula Bc(s) is represented by formulae (6-1), (6-2) below.

[Formula 6]

$$\begin{cases} Bc(s) = Bp(1+D) \quad \left(s: 0 \sim \frac{L}{2}\right) & (6\text{-}1) \\ Bc(s) = Bp(1-D) \quad \left(s: \frac{L}{2} \sim L\right) & (6\text{-}2) \end{cases}$$

A transport progression Sc is obtained by formulae (7-1), (7-2) below through calculation similar to the above.

[Formula 7]

$$\begin{cases} Sc = \int_0^{Sp} \frac{Bc(s)}{Bp} ds \quad \left(s: 0 \sim \frac{L}{2}\right) & (7\text{-}1) \\ \quad = \int_0^{Sp} (1+D) ds & \\ Sc = \int_0^{Sp} \frac{Bc(s)}{Bp} ds & (7\text{-}2) \\ \quad = \text{Total Integrated Value} + \int_{\frac{L}{2}}^{Sp} (1-D) ds \quad \left(s: \frac{L}{2} \sim L\right) & \\ \quad \text{of } (7\text{-}1) & \end{cases}$$

Figure 5:
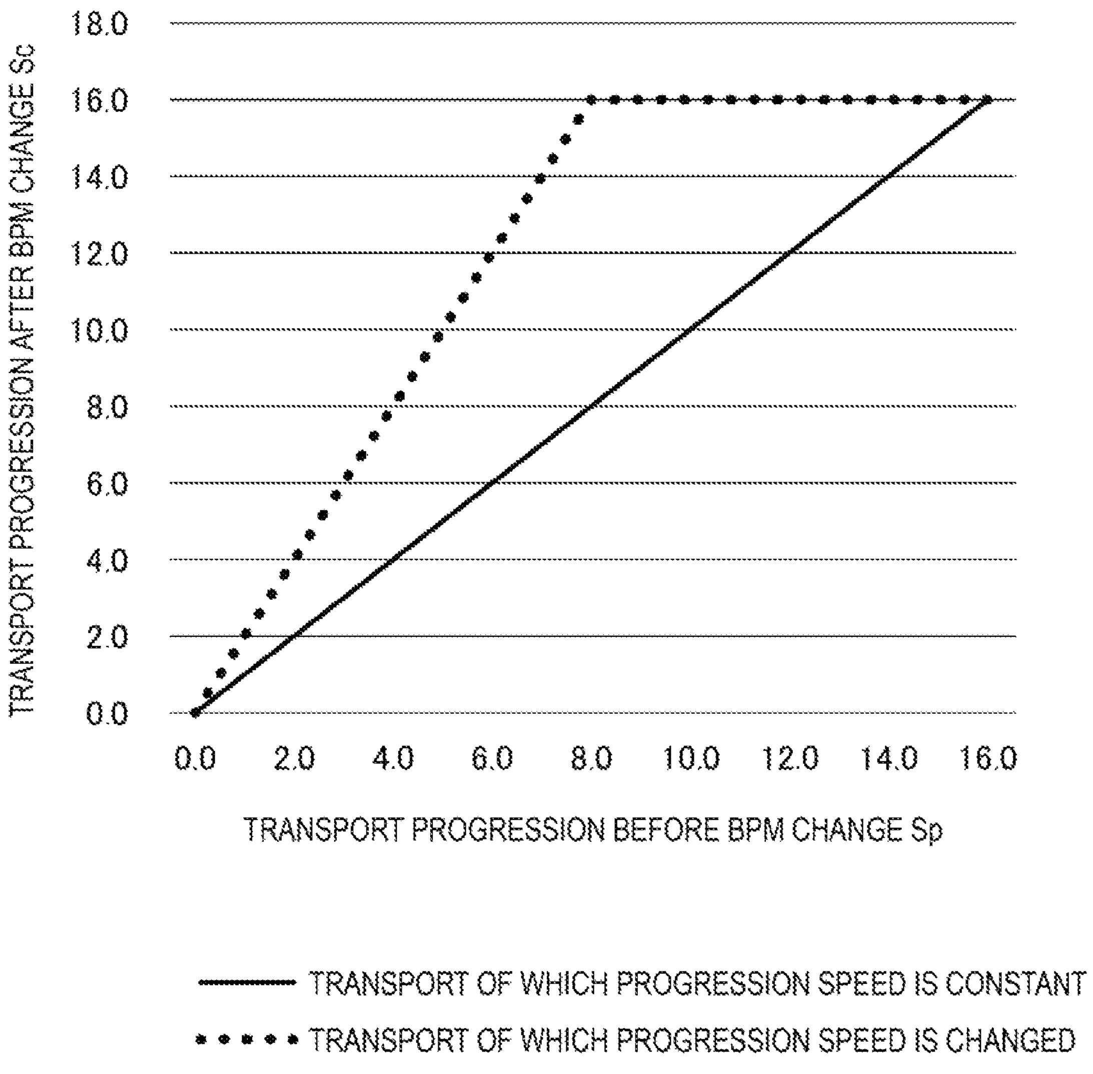
FIG. 5 is a third exemplary illustration showing a relationship between transport before BPM change and transport after BPM change according to the exemplary embodiment.

Formulae (8-1), (8-2) are obtained by solving the formulae (7-1), (7-2) in a section from step 0 to step Sp. When D=+1 and L=16 are satisfied, as shown in FIG. 5, transport after BPM change progresses twice as fast as transport before BPM change for the first eight steps, and does not progress for the remaining eight steps.

[Formula 8]

$$\begin{cases} Sc = Sp(1+D) \quad \left(s: 0 \sim \frac{L}{2}\right) & (8\text{-}1) \\ Sc = Sp(1-D) + DL \quad \left(s: \frac{L}{2} \sim L\right) & (8\text{-}2) \end{cases}$$

(2) Sine Wave

When a formula for changing BPM generates a sine wave, the BPM variable formula Bc(s) is represented by a formula (9) below.

[Formula 9]

$$Bc(s) = Bp + BpD\sin\left(\frac{2\pi s}{L}\right) \quad (9)$$

A formula (10) is obtained by calculating a transport progression Sc similarly to the above.

[Formula 10]

$$Sc = Sp + \frac{D}{k}(1 - \cos k\,Sp)\left(k = \frac{2\pi}{L}\right) \quad (10)$$

Figure 6:
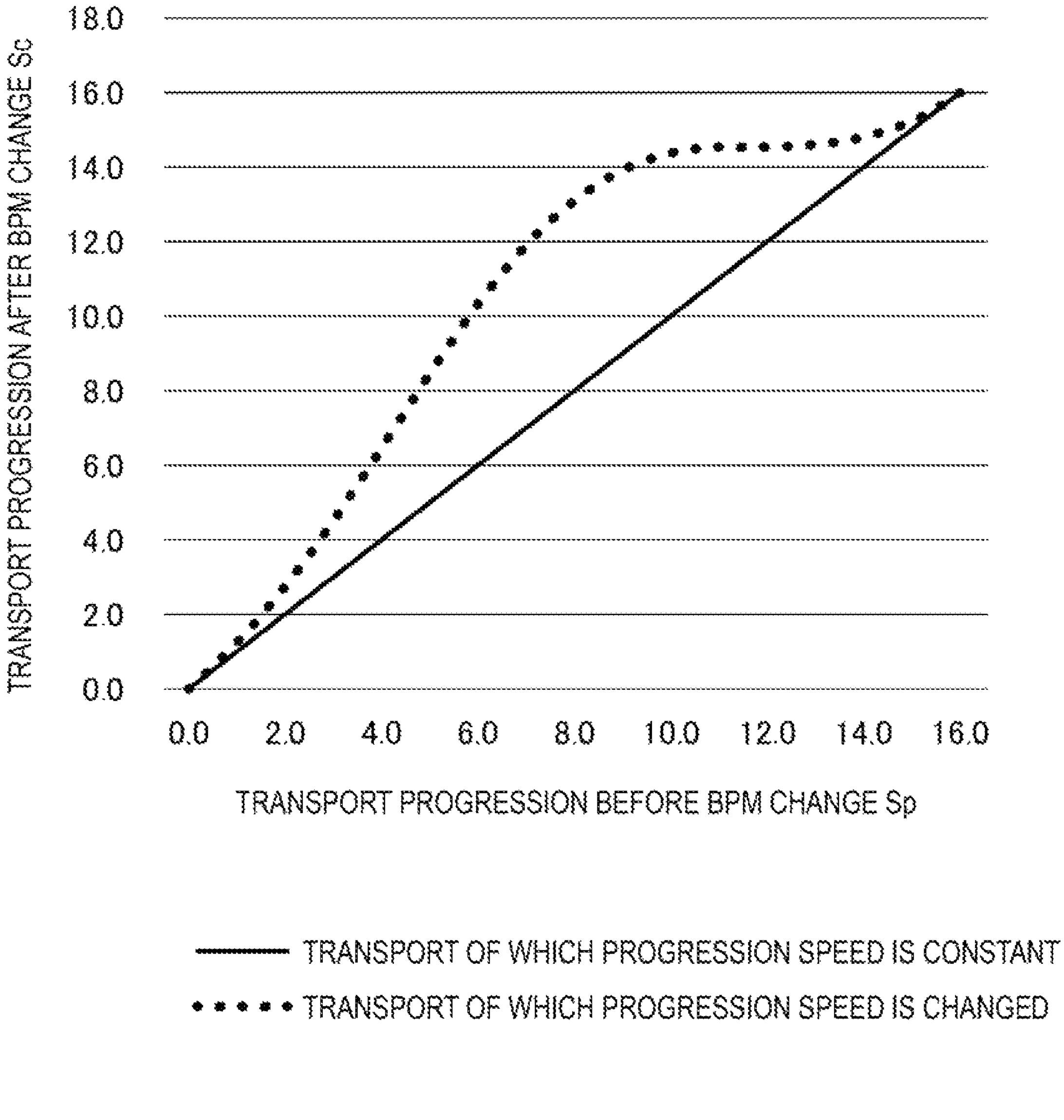
FIG. 6 is a fourth exemplary illustration showing a relationship between transport before BPM change and transport after BPM change according to the exemplary embodiment.

When the formula (10) satisfies D=+1 and L=16, as shown in FIG. 6, a transport progression Sc is larger than a transport progression Sp at the beginning, and becomes Bc=Bp in the middle. Then, BPM is gradually slower, and the transport progression Sc coincides with the transport progression Sp at the end of a specific step section.

(3) Cosine Wave

When a formula for changing BPM generates a cosine wave, the BPM variable formula Bc(s) is represented by a formula (11) below.

[Formula 11]

$$Bc(s) = Bp + BpD\cos\left(\frac{2\pi s}{L}\right) \quad (11)$$

A formula (12) is obtained by calculating a transport progression Sc similarly to the above.

[Formula 12]

$$Sc(s) = Sp + \frac{D}{k}(\sin k\,Sp)\left(k = \frac{2\pi}{L}\right) \quad (12)$$

A formula (13) represents Sc as a cosine wave.

[Formula 13]

$$Sc = Sp + \frac{D}{k}\left\{\cos\left(\frac{\pi}{2} - kSp\right)\right\} \quad (13)$$

Figure 7:
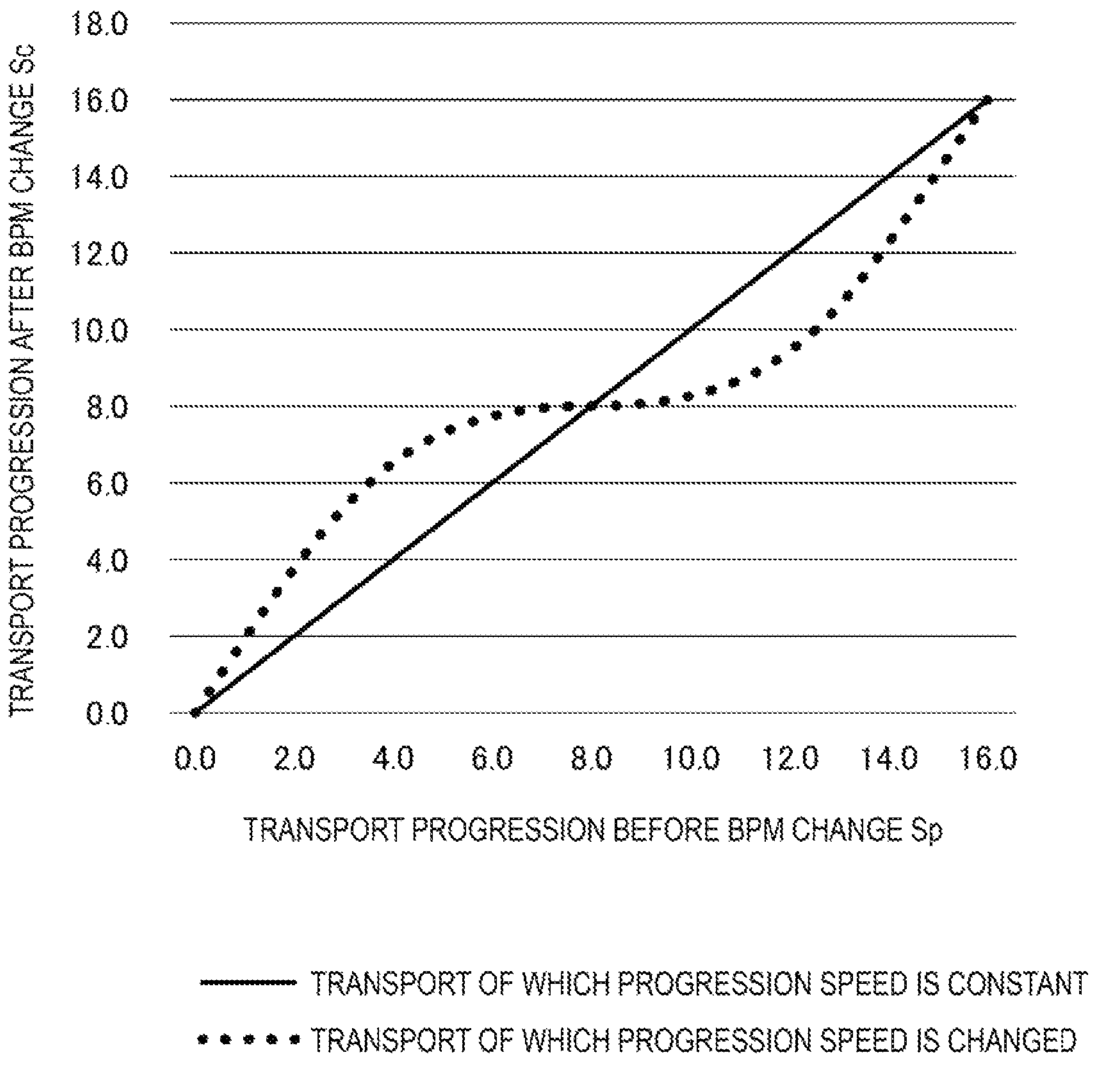
FIG. 7 is a fifth exemplary illustration showing a relationship between transport before BPM change and transport after BPM change according to the exemplary embodiment.

When the formulae (12) and (13) satisfy D=+1 and L=16, as shown in FIG. 7, a transport progression Sc is larger than a transport progression Sc at the beginning, and Bc becomes zero at a position of step 8. The transport progression Sc is behind the transport progression Sp after the step 8, and coincides with the transport progression Sp at the end of a specific step section.

In addition to the above examples, BPM can be changed using any complicated formula satisfying the above formula (2) (e.g., a formula generating a triangular wave or a formula not having a BPM range from 0 to 2 Bp), thus generating a new musical phrase.

The parameter setting unit 5 selects any of the above formulae and sets a degree D of BPM change and a specific step section based on an operator's operation through the parameter operating unit 6. Although not shown in the attached drawings, the parameter operating unit 6 includes a plurality of knobs for inducing an operator to perform operations for determining a variety of parameters. Specifically, the parameter operating unit 6 includes a Select knob for selecting a formula, a Depth knob for adjusting a degree D of BPM change, and a Length knob for adjusting a specific step section.

When an operator operates the Select knob, the parameter setting unit 5 reads out, from the formula storage 4, a formula related to a position where the operation is performed. That is, the Select knob functions as a formula selecting unit of the invention.

When an operator operates the Depth knob, a degree D of BPM change is set in the formula read out.

When an operator operates the Length knob, the number of steps included in a specific step section is set.

Figure 8:
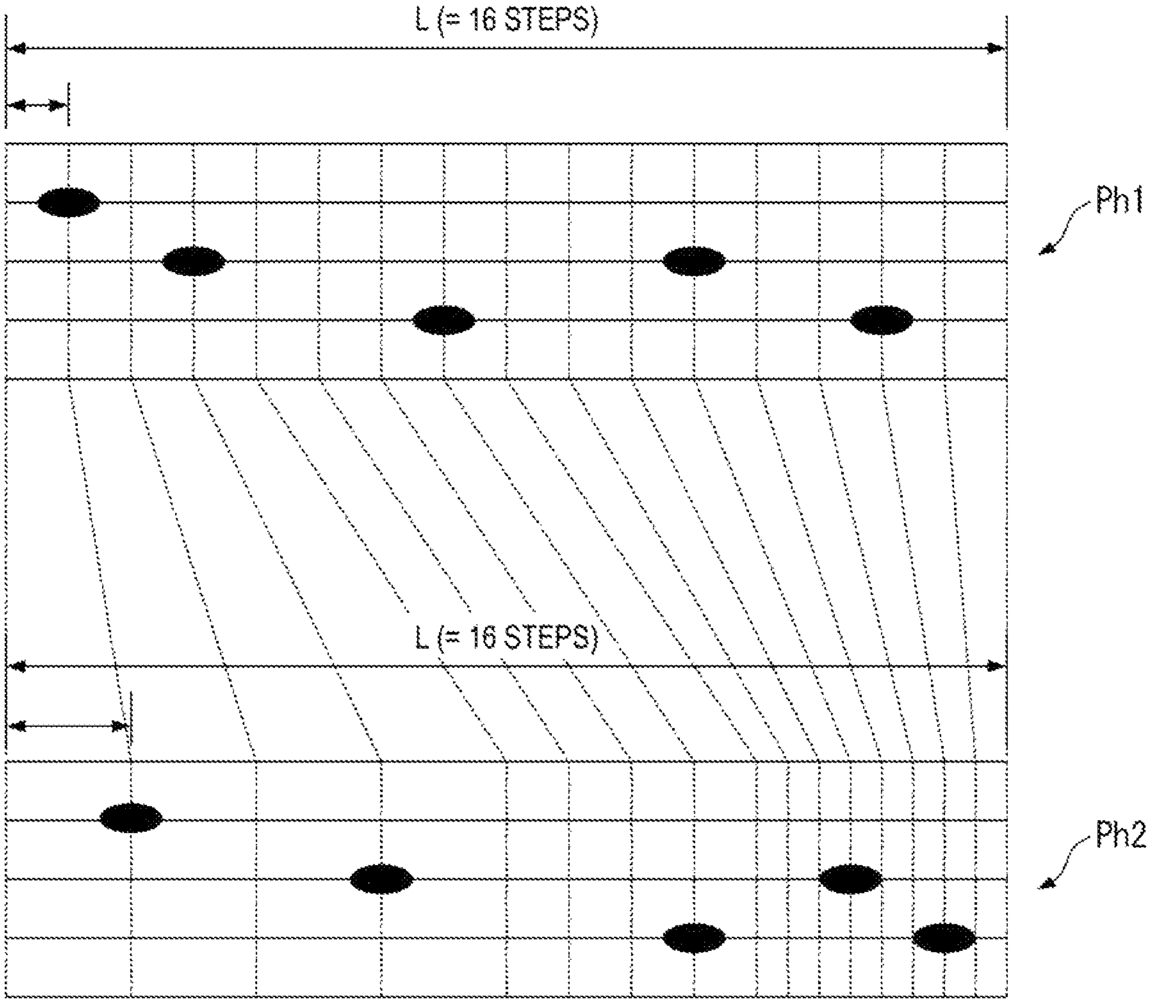
FIG. 8 is a schematic illustration for explaining generation of a phrase according to the exemplary embodiment.

The musical phrase generator 7 generates a new musical phrase based on a formula Sc and outputs the phrase. Specifically, as shown in FIG. 8, BPM is dynamically changed to generate a new musical phrase Ph2 from a musical phrase Ph1 in which sound is produced by transport progressing at a constant BPM in a specific step section, without changing a total time required for transport to pass through the specific step section.

The musical phrase Ph2 is an example where a musical phrase is output such that a transport progression speed after BPM change is first slower than a transport progression speed before BPM change, and is faster gradually toward the end of a specific step section.

The musical phrase generator 7 outputs a musical phrase generated to the outside. Specifically, the musical phrase generator 7 outputs a musical phrase generated as actual sound or MIDI data.

Figure 9:
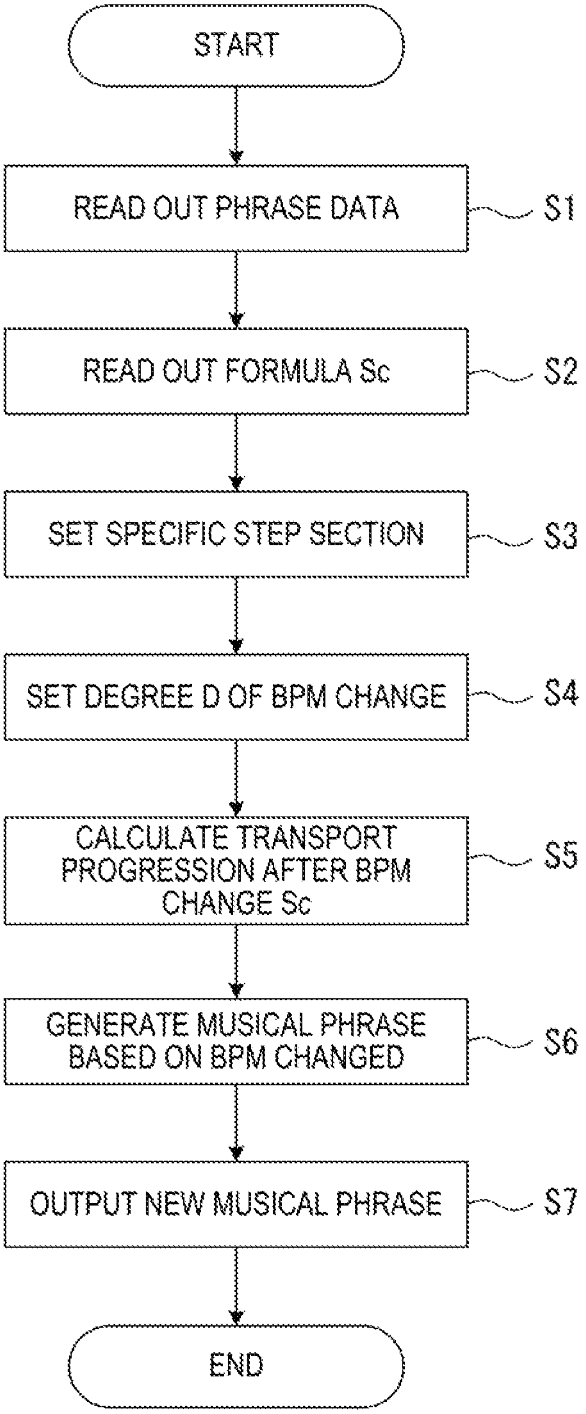
FIG. 9 is a flowchart showing an operation according to the exemplary embodiment.

Subsequently, an operation according to the exemplary embodiment is explained based on a flowchart shown in FIG. 9.

The progression speed changing unit 3 first reads out phrase data selected by an operator from the phrase data storage 2 (S1).

Next, the parameter setting unit 5 reads out a formula Sc from the formula storage 4 based on an operator's operation through the Select knob of the parameter operating unit 6 (S2).

The parameter setting unit 5 sets a specific step section in the formula Sc based on an operator's operation through the Length knob of the parameter operating unit 6 (S3).

Subsequently, the parameter setting unit 5 sets a degree D of BPM change in the formula Sc based on an operator's operation through the Depth knob of the parameter operating unit 6 (S4).

The progression speed changing unit 3 calculates a transport progression Sc after BPM change based on the specific step section and the degree D of BMP change (S5).

The musical phrase generator 7 generates a new musical phrase based on the transport progression Sc calculated by the progression speed changing unit 3 (S6).

Finally, the musical phrase generator 7 directly outputs a new musical phrase generated as a sound output signal, or outputs the new musical phrase generated as MIDI data to any other electronic device that can produce sound (S7).

According to the exemplary embodiment, the following advantages can be achieved.

According to the invention, a transport progression Sc is calculated by a selected BPM variable formula to generate a new phrase without changing a total time for transport to pass through a specific step section. A parameter(s) set for Sc can generate a new phrase, and the same phrase can be easily reproduced by restoring the parameter(s) to the original even after a variety of changes.

It should be noted that the invention is not limited to the above exemplary embodiment, but includes modification(s) described below.

The exemplary embodiment of the invention described above is applied to the music sequencer 1. The invention is not limited thereto, and is applicable to an electronic musical instrument such as a synthesizer.

In the above exemplary embodiment, the formula(s) generating a sawtooth wave, a rectangular wave, a sine wave, a cosine wave, or the like is exemplified as a predetermined formula. The invention is not limited thereto, and the invention is applicable to any formula satisfying the formula (2).

In addition, regarding a specific structure, shape, etc. for implementation of the invention, any other structure, etc. may be employed as long as an object of the invention is achievable.

The invention claimed is:

1. An electronic musical instrument, comprising:

a progression speed changing unit configured to change a progression of transport using a predetermined formula such that a total time required for the transport to pass through a specific step section of musical piece data is not changed;

a parameter setting unit configured to set a parameter for the predetermined formula and the specific step section;

a parameter operating unit configured to induce an operator to perform an operation for determining the parameter and the specific step section to be set by the parameter setting unit; and a musical phrase generator configured to generate a musical phrase by assigning the parameter set by the parameter setting unit to the predetermined formula based on the progression of the transport changed by the progression speed changing unit, wherein the parameter setting unit is configured to, based on the operation performed by the operator on the parameter operating unit, set the parameter for the predetermined formula and set the specific step section, the musical phrase generator is further configured to output the musical phrase directly as a sound output signal or to output the musical phrase as MIDI data to an electronic device that can produce sound, and the parameter includes a parameter for adjusting a degree of BPM change.

2. The electronic musical instrument according to claim 1, wherein the predetermined formula satisfies a formula below when, in the specific step section, a transport progression before BPM change is defined as Sp, a transport progression speed before BPM change is defined as Bp, a transport progression after BPM change is defined as Sc, and a transport progression speed after BPM change is defined as Bc(s), $$S = \int_0^{Sp} \frac{Bc(s)}{Bp} ds. \qquad (1)$$

3. The electronic musical instrument according to claim 1, wherein the predetermined formula is configured by a plurality of formulae prepared in advance, and the parameter operating unit includes a formula selecting unit configured to select any of the plurality of formulae.

4. A non-transitory computer-readable recording medium recording a musical phrase generation program configured to cause a computer to function as the electronic musical instrument according to claim 1.

* * * * *